US006880323B2

(12) United States Patent
Coleman

(10) Patent No.: US 6,880,323 B2
(45) Date of Patent: Apr. 19, 2005

(54) WIDTH ADJUSTABLE CHAIN TOOL

(76) Inventor: Bradley B. Coleman, 2107 W. Commonwealth Ave., PMB #401, Alhambra, CA (US) 91803

( * ) Notice: Subject to any disclaimer, the term of this patent is extended or adjusted under 35 U.S.C. 154(b) by 147 days.

(21) Appl. No.: 10/184,820

(22) Filed: Jun. 29, 2002

(65) Prior Publication Data

US 2004/0250528 A1 Dec. 16, 2004

(51) Int. Cl.[7] .......................... B21L 21/00; B23P 19/04
(52) U.S. Cl. ................................ 59/7; 59/35.1; 29/257
(58) Field of Search .................... 59/7, 8, 35.1; 29/257, 29/251, 270, 281.1

(56) References Cited

U.S. PATENT DOCUMENTS

| | | | | | |
|---|---|---|---|---|---|
| 3,553,960 | A | * | 1/1971 | Ellefson | 59/7 |
| 4,833,875 | A | * | 5/1989 | Buermann et al. | 59/7 |
| 5,203,158 | A | * | 4/1993 | Bowers | 59/7 |
| 6,748,637 | B1 | * | 6/2004 | Meggiolan | 29/257 |

* cited by examiner

*Primary Examiner*—David Jones
(74) *Attorney, Agent, or Firm*—Stout, Uxa, Buyan & Mullins, LLP; Donald E. Stout

(57) ABSTRACT

A chain tool used to disassemble or assemble a chain includes a set of spacers allowing micro adjustability to facilitate first and second anvil surface contact with chain plates when chain connection pins are being displaced or replaced to disassemble or reassemble a chain.

11 Claims, 2 Drawing Sheets

WIDTH ADJUSTABLE CHAIN TOOL

BACKGROUND OF THE INVENTION

1. Field of the Invention

A chain tool used to break or assemble a chain includes an adjustable element that enables its use on chain of various different widths. Chain tools have existed and are in widespread use however there is a chain and tool compatibility situation that limits the use of most chain tools to a narrow range of chain widths if chain pin driving accuracy is required.

2. Summary of the Invention

A chain tool of the general type disclosed here is a tool that is used in working with chain used as a drive or indexing mechanism in industrial applications. Common uses of chain of the type pertinent to this invention include chain used in a motor/axle drive system having a drive sprocket and a driven sprocket, for instance in a go-kart, or, as another example, in a bicycle drive system. A chain tool is used to separate semi-permanently connected chain links so that a chain can be shortened, lengthened, or separated and reassembled to fit over, for instance, a drive sprocket and a driven sprocket.

A chain is made up of links having several parts. Each link includes a first and a second outboard plate of a generally elongated shape with an aperture at each end of the plates passing through the plates. First and second inner plates separated by and fixedly mounted to, a pair of bushings, one at each end of the first and second inner plates. These chain link elements are assembled as a unified structure and are not designed to be taken apart. The inner chain link elements make up a portion of the chain link located between the first and the second outboard plates. The bushings of the chain link elements between the inner plates may be, in certain types of chain, provided with a free-floating sleeve carried on the bushings of the inner plates. The free-floating sleeves function as bearing surfaces that interface with the sprockets that the chain is directed around. The chain tool presented here will work equally well with chain having bushings only or with chain having sleeves over the bushings.

Pins are used to connect a link set together and to connect one link set to another link set. A pin will pass through an aperture in a first outboard plate, through the bushing of the inner plates and out through an aperture of the second outboard plate. This, plus the inclusion of a second pin will, for the purposes of this specification will be the components making up a chain link.

The second pin is used to connect one chain link to a second chain link. The second chain link will have outer plates at one end thereof and a second end that just has the inner link. The outer plate end of the link to be attached to the first link will be positioned over the inner link portion of the first link and a pin will be forced through the first outer plate of the second chain link, through the bushing of the first link and finally into and through the aperture of the second outboard link of the second link. This is a very simple system that has been used on chain for many years and will therefore be familiar and routine to a person of ordinary skill in the chain art.

In order to allow the connection of one chain link to another it is necessary to be able to push the chain link pin inboard through the outer plate, through the inner link portion and out through the second outer plate accurately and consistently. To remove a link from a chain it is necessary to push the aforesaid pin out of the outboard plate, through the inner link portion and ideally only partially out the second outboard plate—so that the pin is retained in the second outboard plate for future use and to make it easier to push the pin back in place on a subsequent attachment.

The tool to do this is a chain tool, often called a "chain breaker," that is commonly used to separate and reconnect links of chain. A chain tool usually is compatible with only a single width of chain or if it can accommodate various chains of different widths it may be a less precise universal chain tool that does not have the accuracy necessary for assembling high performance chain and its links as may be found on performance go-karts for instance. In such applications it is imperative that the chain be properly assembled as the chain is being used to drive a go-kart that could be traveling over a hundred miles an hour.

The chain tool presented here differs from the chain tools known to the inventor in that the forces required to push a link pin in or out of a chain link are restrained by a substantial wall surface that is on the side of the chain link that is away from the side where the chain pin is being pushed. This allows the significant forces needed to resist the pin displacement forces to be resisted in a way that prevents distortion of the "near side" outer chain plate as is possible with known chain tools.

As chain is available in different widths it is important that the width of the chain is accommodated by the chain tool without compromising the precision and functionality of the tool. Current chain tools may accommodate different widths of chain but to do so cannot provide the secure support needed to hold a chain securely to avoid chain distortion. The adjustability of the inventor's chain tool, provided by the use of a main spacer and shims or secondary spacers does provide for the ability of the chain tool to accommodate chain of different widths while providing the solid anvil needed to assure that the chain links, normally the chain plates, are not distorted as the chain is being assembled or "broken."

Thus it is an object of this invention to provide a chain tool for adding chain links, subtracting chain links or otherwise simply connecting chain links, that is adjustable to accommodate chain of different widths.

It is also an object of this invention to provide adjustability to a chain tool by the use of spacers, including a main spacer and secondary spacers or shims.

An advantage of this chain tool is that it provides for support of a chain link by positioning an offside chain plate against a secure wall surface, acting as an anvil surface, while chain pin removal or replacement is being accomplished through a chain plate on the other side of the chain link.

One more advantage is that the chain tool is provided with recesses to accommodate chain pin ends on the offside of the chain links being services such that the associated chain plates can rest flat and securely against a support wall of the chain tool.

Another object of the invention is to allow a chain link to contact one or more of a series of upstanding pickets that provide an anvil surface for the inboard surface of outer chain links.

It is also an object and advantage of the invention to provide a first anvil surface for contacting the inside surface of a chain plate and a second anvil surface for contacting the outboard surface of an offside chain plate when a chain link is placed in the chain tool.

Another object of the invention is to provide for chain tool adjustment so that the first and second anvil surfaces correspond with the distance between the inner surface of a first chain plate and the outer surface of an offside chain plate.

It is also an advantage of the invention that virtually all the components of the chain tool can be replaced with spare parts without the need to scrap the entire tool. For instance, the alignment plate, the main spacer, the end plate, the rod and the secondary spacers are all easily substituted with replacement parts by a person of ordinary skill in the art.

These and other advantages of the invention will be discernable from the following description of the invention.

The preferred embodiment of the invention is described in the following Detailed Description of the Invention and attached Figures. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

The invention will be understood by a review of this disclosure of the invention in combination with a review of the drawing figures in which.

DESCRIPTION OF PREFERRED EXEMPLARY EMBODIMENTS

Figure 1:
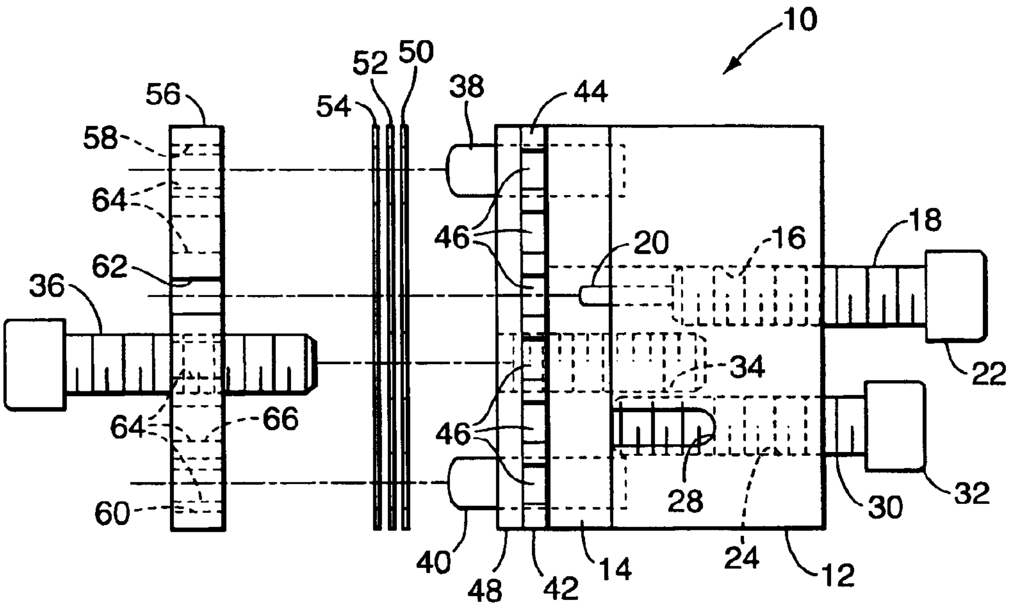
FIG. 1 is a top view of the chain tool shown in an expanded view.

In the drawing figures like reference numbers identify like parts in the various views.

Figure 2:
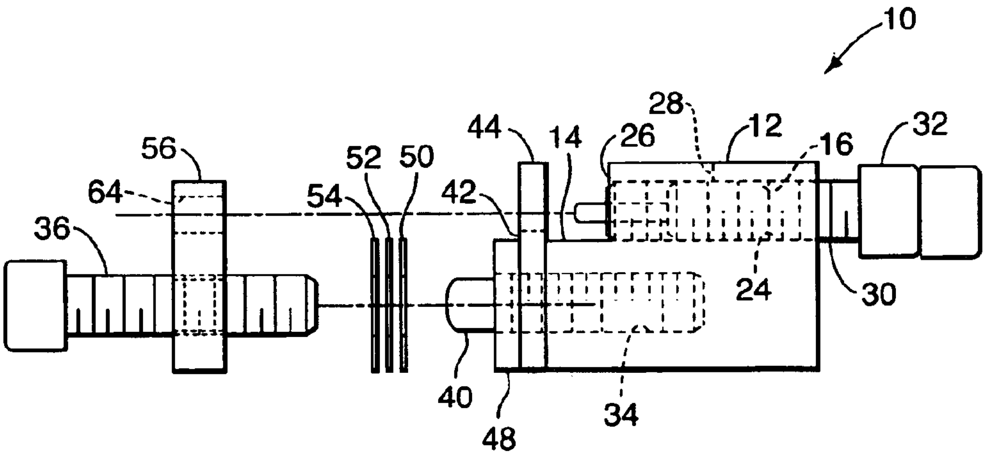
FIG. 2 is a side elevation view of the chain tool shown in FIG. 1 also in an expanded view.
Figure 3:
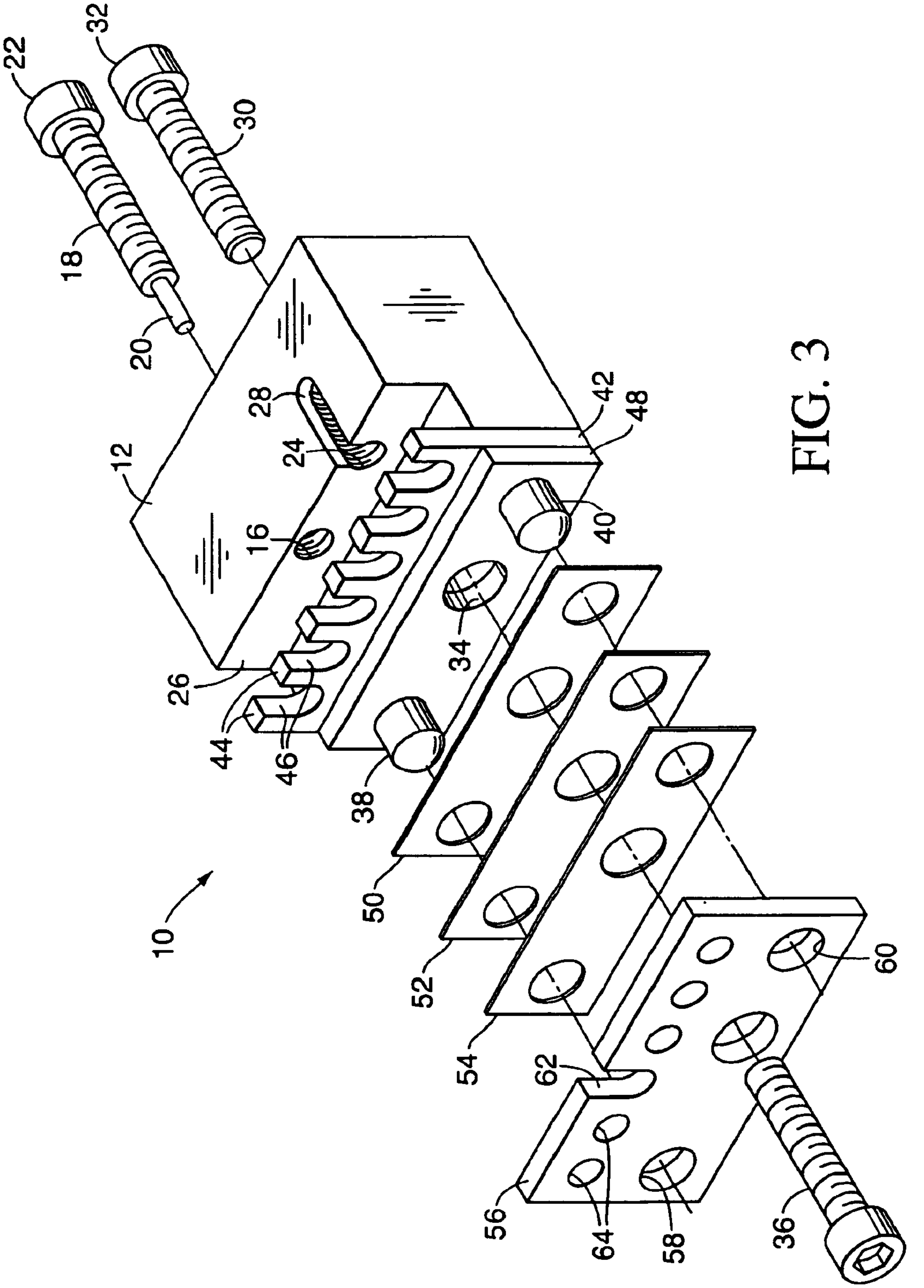
FIG. 3 is a perspective exploded view of the chain tool shown in FIGS. 1 and 2.

Looking at all the figures in the disclosure, that is FIGS. 1, 2 and 3 the invention is presented clearly. The chain tool, generally 10, is made up of a main body 12. This main body would normally be steel, however aluminum; another metal, such as but not limited to magnesium or brass; a high performance carbon fiber; phenolic resin or high performance plastic substance may be used. The block is generally a rectangular solid having a height about half of its width. The main body is provided with a recess 14, having a floor surface and a wall surface, formed in it that will accommodate one side of a chain. The main body 12 is also provided with an aperture, in this embodiment a first threaded aperture 16. This threaded aperture intercepts, that is extends to, the recess 14, by entering the wall surface of the recess. A pin displacement element 18, in this embodiment having a threaded section that can be moved laterally through the first threaded aperture 16 in the main body as it is threaded into or out of the first threaded aperture, supports a rod 20. The rod 20, a press-fit element is concentrically located on the inboard end of the pin displacement element, is used to push the pin of the chain link out of the chain link outer plates. The threaded pin displacement element may have a socket head 22 into which a socket driver is inserted to turn the displacement element. Alternative head arrangement, such as but not limited to, hex head or slotted head embodiments are contemplated by the inventor.

The main body 12 is provided with a second aperture 24, in this preferred embodiment, also a threaded aperture, that extends to and through, thus intercepting, the wall surface or vertical face 26 of the recess 14 in the main body 12. As can be seen in the figures the second threaded aperture 24 is at the same elevation as the first threaded aperture 16.

The main body has a cutout 28 located above and through to the second threaded aperture 24. This cutout 28 allows visual observation of the location of the inboard end of a pin setting element 30. In FIG. 2 the inboard end of the pin setting element can be seen as a solid line representation of a thread and is clearly visible in FIG. 3. This pin setting element may have a socket head 22 into which a socket driver is inserted to turn the setting element. As with the pin displacement element 18, alternative head arrangements, such as but not limited to, a hex head or slotted head embodiments are alternatives.

There are three other blind holes formed in the main body 12. These include a threaded aperture, the third threaded aperture, 34 for accommodating an assembly retainer fastener 36 which is threaded into the main body and holds the various main and secondary spacer elements in place as is described below.

A pair of alignment lugs, 38 and 40, are fitted to the main body, most typically by press fitting them in place as they do not need to be removed once they are installed.

The main body is one element of several components that do not come apart under normal use, however it is possible to change out the alignment plate 42 and the main spacer 48 for a proper initial or subsequent set up of the chain tool. For instance, the main spacer 48 provides a macro width adjustment and main spacers of different thickness can be used for this macro adjustment. The secondary spacers or shims disclosed below are used for fine tuning or micro adjustment to provide proper spacing for a given chain width. In addition to the main body 12, an alignment plate 42 is positioned on the alignment lugs 38 and 40 and fits up against the main body adjacent the recess 14 to create support for chain which is placed over the pickets, one of the seven pickets is shown in FIG. 1 identified as item 44, such that the chain bushings reside in the spaces such as 46 between the pickets 44. The spaces 46 and pickets 44 are clearly seen in FIG. 3. The pickets 44 extend above the floor of the recess in the main body. The surface of the alignment plate 42 closest to the recess 14 in the main body 12 may be a first anvil surface that will, when a chain link is in place in the chain tool, will contact the inside surface of the chain plate on the recess side of the alignment plate 42.

One other component is securely engaged with the main body. This is the main spacer 48. It is carried on the alignment lugs 38 and 40 and is pressed up against the alignment plate 42. Under normal use this main spacer 48 will not be removed from the main body 12. It can be removed and replaced with a main spacer of a different thickness but in normal circumstances the main spacer 48 will not be routinely changed.

As shown in FIGS. 1, 2 and 3, a series of secondary spacers, 50, 52, and 54, (three are shown but the inventor contemplates that more or less than three secondary spacers can be used to adjust the width of the chain tool) are provided. These secondary spacers have three apertures through each of them. Two apertures allow the secondary spacers to be fitted over the alignment lugs 38 and 40 and the third aperture in each secondary spacer allows passage of the assembly retainer fastener 36. The function of the secondary spacers is to provide proper depth for a particular width of chain that is being worked on as will be discussed below.

The secondary spacers are retained in place and sandwiched between the main spacer 48 and an end plate 56. The end plate, like the main and secondary spacers, has three through apertures. Two of these apertures, a first and a second end plate aperture, 58 and 60 respectively, are locating apertures to locate the end plate 56 on the alignment lugs 38 and 40. The third aperture in the end plate is an unthreaded hole that accommodates the assembly retainer fastener 36.

The end plate is also provided with a relief groove 62 at the top of the end plate. This relief groove is located in alignment with the rod 20 of the pin displacement element 18 and is also aligned with an appropriate space, such as 46, between pickets such as 44. The relief groove 62 allows pin clearance such that a chain link with a pin pressed almost all the way through an outboard plate can be removed from the chain tool.

A series of holes, one of such holes shown as 64 in FIG. 1 and several as shown in FIG. 3, are provided near the upper portion of the end plate 56. Each of these holes, which alternatively can be shallow depressions, blind holes, or relief grooves such as relief groove 62, are provided to accept the end portions of pins of assembled links that are positioned in the chain tool. This allows the outboard chain plate to rest flat and squarely against the inboard surface of the end plate such that when a pin is being pushed out of a chain link the pin ends that protrude from the outboard chain plates will be in the holes 64. This surface serves as an anvil surface to resist forces on the offside chain plates when a chain link is being serviced, i.e. a pin is being driven in or out of the chain link.

When the assembly retainer fastener 36 is threaded into and through the third threaded aperture 34 of the main body 12, after passing through the end plate 56, the number of secondary spacers (50, 52 and 54) deemed necessary for a particular width of chain, and through the main spacer 48 and the alignment plate 42, it is tightened to unify all the components of the chain tool generally 12. Once the chain tool is set up, by varying the number of and/or width of the main and secondary spacers, it is left assembled until there is a need to adjust the tool, usually by adjusting the secondary spacers, for a different width of chain.

The operation of the chain tool is as follows. The chain to be disassembled is placed in the chain tool. The operator knows the width of the chain and has inserted the correct number and thickness of secondary spacers (50, 52, 54) such that the chain fits over the pickets 44, into the spaces 46 between the pickets, and has the outboard side of the outboard plates flush against the inboard side of the end plate 56 with the ends of the pins in the holes 64 and the pin to be pushed out of the chain link aligned with the relief groove in the top of the end plate. Ideally, the secondary spacers will be selected so that the first and second anvil surfaces, that is the recess side of the alignment plate and the "inside" wall of the end plate 56, respectively, correspond with the width of the chain between the inside surface of the first chain plate and the outboard surface of the second or off-side chain plate. With the chain in the chain tool the pin driver or pin displacement element 18 is screwed into the main body 12 until the rod 20, which is the correct diameter for use with the pin being removed, either the same size or slightly smaller in diameter, makes contact with the pin to be displaced. The pin driver 18 is further threaded into the main body and as it does so the rod end will push the pin of the chain link out of the first outer chain plate, through the inner link and partially out of the chain plate on the other side of the chain which is against the inboard wall of the end plate. Normally there is no need to push the pin all the way out of the second chain plate. Doing so will make it difficult to start the pin back in the chain plate when it comes time to reassemble the chain.

The invention includes the use of a main and secondary spacers, if and as necessary, in the assemble of the chain tool. Secondary spacers are added or withdrawn from the tool, between the inside surface of the end plate and the surface main spacer 48 that isn't adjacent the alignment plate. The tool is not designed to be adjustable for chain of different pitch—the distance between pin centers of the chain links. The chain tool is only adjustable for chain of different widths of chain having the same pitch.

To couple links together the separated chain links are positioned in the chain tool such that the protruding pin of one of the links is placed in the cut out 28 of the main body 12 after the pin setting element 30 has been retracted sufficiently to clear the pin projecting from the side plate of the of the chain link. Other links will be placed in the spaces between the pickets 44 and all of the chain links will be located flush against the inboard surface of the end plate 56 with existing pins in the holes 64. With the components in place the pin setting element 30 is screwed into the second threaded aperture 24 of the main body 12. The pin contacting end of the pin setting element 30 may be a flat surface or a cavity to assist in aligning the pin of the link as it is being driven through the near outer plate, the inner link elements, and the aperture in the outer chain plate that is pressed against the wall surface of the main spacer 56. There is a hole, shown as 66 (similar to those shown as 64 in that it may be a blind hole or depression), aligned with the centerline of the pin setting element 30, that accommodates the slight projection, if any of the pin through the outer chain plate.

In summary the apparatus of the invention is a chain tool that comprises a main body having a plurality of apertures, including a first aperture, a second aperture and a threaded aperture. The first and second apertures are threaded through bores in a preferred embodiment. A pin displacement element is carried in the first aperture. The pin displacement element includes a rod that is press fitted into the end of the pin displacement element. There is also a pin setting element carried in the second aperture of the main body. The chain tool includes an alignment plate having a first anvil surface and an aperture located such that it is alignable with the threaded aperture of the main body. A main spacer, having an aperture therethrough, is alignable with the threaded aperture of the main body. The main spacer is located adjacent the alignment plate. A secondary spacer, having an aperture therethrough, is also alignable with the threaded aperture of the main body as is an end plate, having a second anvil surface and an aperture therein. The various plates and spacers are held together using an assembly retaining fastener which passes through the end plate aperture, the spacer, the main spacer, and the alignment plate aperture and into the threaded aperture of the main body to retain the alignment plate, the main spacer, the secondary spacer and the end plate to the main body.

The inventor also believes that the invention includes the method of assembling and/or breaking a chain. That method includes but is not limited to separating a link of chain from another link of chain using a chain tool having a first and a second anvil surface and a rod, both as described above. The chain links to be separated have a pair of apertured inner plates, bushings between the inner plates, and first and second apertured outer plates. The outer plates are located on each side of the inner plates. Each outer plate having an outer surface and an inner surface. There is a pin pressed through an aperture of the first outer plate, a bushing and the apertures of the inner plates, and an aperture of the second outer plate making up a chain link as is well know in the art. Part of the method of separating links includes the acts of supporting the chain against the first anvil surface by contact of the inner surface of the first outer plate with the first anvil surface and supporting, simultaneously, the chain against the second anvil surface by contact of the outer surface of the second outer plate. The pin is then pushed out of contact with the first outer plate and out of the bushing with the rod thus allowing separation of one link from an adjacent link.

To attach two links of chain together using a chain tool having a first and a second anvil surface and a pin setting element the chain is supported against the first anvil surface by contact of the inner surface of the second outer plate with the first anvil surface and is also supported simultaneously against the second anvil surface by contact of the outer surface of the first outer plate of the chain. Then the pin of the chain is pushed through the second outer plate, a bushing between the inner plates and into the aperture of the first outer plate with the pin setting element.

The inventions set forth above are subject to many modifications and changes without departing from the spirit, scope or essential characteristics thereof. Thus, the embodiment explained above should be considered in all respect as being illustrative rather than restrictive of the scope of the invention as defined in the appended claims. For example, the present invention is not limited to the specific embodiments, apparatuses and methods disclosed that are simply designer choices. For instance, this invention may include interchangeable parts that allow the chain tool to not only be used with various widths of chain by changing the thickness of the main spacer, the secondary spacers, the alignment plate and the size of the rod but to also provide for the replacement of broken, damaged or re-engineered parts without the need for replacing the entire chain tool.

What is claimed is:

1. A chain tool comprising:

(a) a main body having a plurality of apertures, including a first threaded aperture, a second threaded aperture, and a third threaded aperture therein;

(b) a pin displacement element carried in the first threaded aperture, the pin displacement element including a rod at one end thereof;

(c) a pin setting element carried in the second threaded aperture;

(d) an alignment plate providing a first anvil surface and having an aperture located therein alignable with the third threaded aperture of the main body;

(e) a main spacer having an aperture therethrough alignable with the third threaded aperture of the main body, the main spacer located adjacent to the alignment plate;

(f) a secondary spacer having an aperture therethrough alignable with the third threaded aperture of the main body;

(g) an end place providing a second anvil surface and having an aperture therein alignable with the third threaded aperture of the main body; and (h) an assembly retaining fastener passing through the end plate aperture, the spacer, the secondary spacer, the main spacer, and the alignment plate aperture and passing into the third threaded aperture of the main body to retain the alignment plate, the main spacer, the secondary spacer and the end plate to the main body.

2. The apparatus in accordance with claim 1 and further comprising:

(a) a recess having a floor portion and a wall portion, the recess in the main body intercepting the first and the second threaded apertures; and (b) a cut out in the main body above and through to the second threaded aperture, the cut out extending from the wall surface of the recess in the main body into the main body.

3. The invention in accordance with claim 2 and further comprising:

(a) a pin displacement element carried in the first threaded aperture, the pin displacement element including a rod at one end thereof; and (b) a pin setting element carried in the second threaded aperture.

4. The invention in accordance with claim 3 and further comprising the alignment plate having upstanding pickets and spaces between the pickets, the pickets having a height extending above the floor of the recess in the main body.

5. The invention in accordance with claim 4 wherein the end place comprises a relief groove aligned with the first threaded aperture in the main body.

6. The invention in accordance with claim 5 wherein the end plate comprises a plurality of holes aligned with the spaces between the pickets.

7. The invention in accordance with claim 6 and further comprising an alignment lug carried by the main body.

8. The invention in accordance with claim 7 wherein the alignment plate, the main spacer, the secondary spacers and the end plate are provided with apertures to accept the alignment lug.

9. A chain tool comprising:

(a) a main body having a plurality of apertures, including a first aperture, a second aperture and a third aperture therein;

(b) a pin displacement element carried in the first aperture, the pin displacement element including a rod at one end thereof;

(c) a pin setting element carried in the second aperture;

(d) an alignment plate having a first anvil surface and an aperture located therein alignable with the threaded aperture of the main body;

(e) a main spacer having an aperture therethrough alignable with the threaded aperture of the main body, the main spacer located adjacent to the alignment plate;

(f) a secondary spacer having an aperture therethrough alignable with the threaded aperture of the main body;

(g) an end plate having a second anvil surface and having an aperture therein alignable with the threaded aperture of the main body; and (h) an assembly retaining fastener passing through the end plate aperture, the spacer, the main spacer, and the alignment plate aperture and passing in the threaded aperture of the main body to retain the alignment plate, the main spacer, the secondary spacer and the end plate to the main body.

10. A chain tool, comprising:

(a) a main body having a wall surface defining one side of a recess for accommodating a portion of a chain to be modified;

(b) an alignment plate spaced from said wall surface and defining a second side of said recess;

(c) an end plate spaced from said alignment plate, wherein a distance between said alignment plate and said end plate is adjustable; and (d) one or more spacers disposed between said alignment plate and said end plate, wherein the number of spacers is changeable in order to adjust said distance between said end plate and said alignment plate.

11. The chain tool according to claim 10, wherein said alignment plate comprises a plurality of upstanding pickets.

* * * * *